United States Patent [19]
de Vos

[11] 3,745,229
[45] July 10, 1973

[54] DUCT AND ELECTRICAL CONNECTOR ASSEMBLY

[75] Inventor: Maarten de Vos, Dubbeldam, Netherlands

[73] Assignee: Fokker-V.F.W. N.V., Schiphol-Oost, Netherlands

[22] Filed: Aug. 16, 1971

[21] Appl. No.: 172,111

[30] Foreign Application Priority Data
Aug. 19, 1970  Netherlands...................... 7012238

[52] U.S. Cl..................... 174/101, 138/116, 174/49, 174/97
[51] Int. Cl.............................................. H02g 3/04
[58] Field of Search...................... 174/48, 49, 68 C, 174/72 A, 95, 96, 97, 101; 52/221; 138/115, 116, 117; 317/122

[56] References Cited
UNITED STATES PATENTS
3,403,220   9/1968   Riedel et al.......................... 174/101
3,471,629   10/1969  O'Leary................................. 174/49

FOREIGN PATENTS OR APPLICATIONS
435,396    10/1967   Switzerland...................... 174/68 C
1,276,153   8/1968   Germany.............................. 174/97

Primary Examiner—Laramie E. Askin
Attorney—Snyder, Brown & Ramik

[57] ABSTRACT

Cable duct for separate cables of different voltage, especially mains cables and telecommunication e.g. telephone, radio and television cables to be taken up in separate longitudinal duct channels and to be connected to terminals of switches, outlets or other appliances in connection chambers of the duct, with transition channels for cables bypassing connection chambers.

9 Claims, 10 Drawing Figures

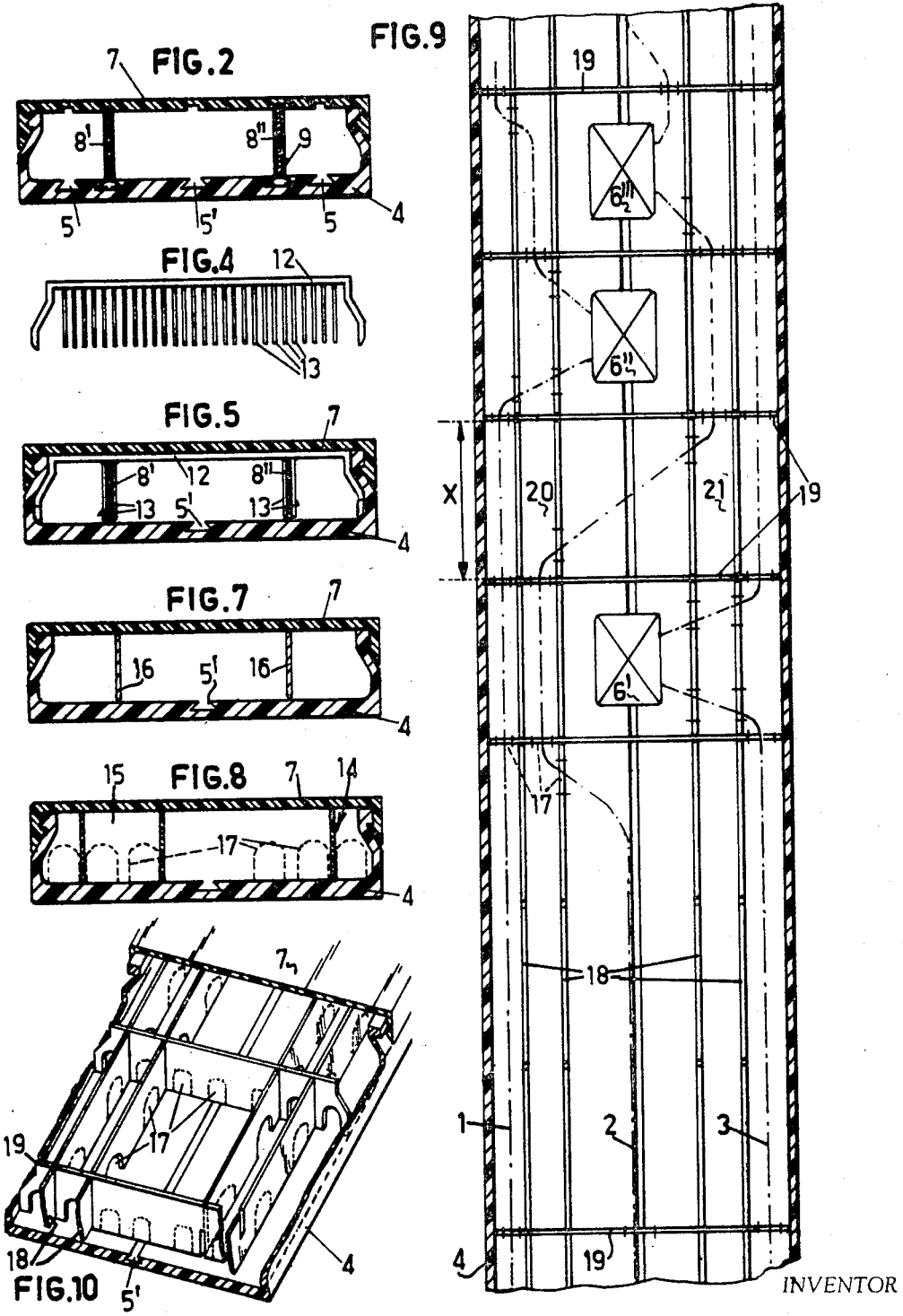

DUCT AND ELECTRICAL CONNECTOR ASSEMBLY

The invention relates to a cable duct for a number of separate electric cables or conductors to be arranged in separate longitudinal channels of the duct, especially for main service or power cables (high tension cables) and low tension cables (e.g. telephone, radio, television or communication cables), said duct having a number of connection chambers disposed centrally across the width of the duct for connecting said cables to terminals of outlets, switches, lampfittings or similar elements, arranged in coverplates of the duct. Such cable ducts are available on the market for electrical appliances in several modern countries and are used on behalf of electrical wiring systems in order to have a number of electrical conductors or cables in the same duct, said cables or conductors being at different electrical voltages (e.g. 220 volts respectively 24 volts). In many cases it is necessary, to fulfil the requirements, that cables or conductors at different electrical voltages should not be arranged in the same channel or space of the duct. When using the above cable duct, it is necessary to pass the central cable or conductor through a separate tube through a connection chamber if a conductor belonging to a side channel has to be connected to the element of said connection chamber. The use of such tubes to be incorporated into the connection chamber provides difficulties when installing the cables or conductors. The object of the invention is a cable duct of the abovementioned type enabling an easy and simple instalment of cables and conductors and, moreover, a simple and efficient manufacture of the duct.

The cable duct according to the invention is characterized in that between a central longitudinal channel in line with said connection chambers, and a side channel next to said central channel a transition channel may be arranged for taking up a cable section passing along a connection chamber if said cable section does not enter the connection chamber in question. The invention provides a simple and efficient construction of the cable duct and an easy instalment of the cables or conductors, fulfilling the requirements for safety.

An efficient embodiment of the invention is characterised by resilient uninterrupted separator strips for separating adjoining channels, said strips being bent suitably in the vicinity of connection chambers in order to take up cable sections in transition channels. In this case it is possible to use straight connection grooves on the bottom of the duct for taking up connection members for the resilient strips. Another efficient embodiment is characterised by separating combs, arranged perpendicularly with respect to the bottom of the duct and to said separator strips, said strips passing between adjoining teeth of the combs, of which the teeth may be removed locally to allow passage of cables.

A further embodiment is characterised by separate inserts, the inserts together with the bottom and cover of the duct forming a central connection chamber, and also a transition space forming part of a transition channel. In this case it is possible to use one or more reversible inserts, the transition space of which the first position being in line with the first transition channel beyond the insert, and in the second position in line with the second transition channel beyond the insert. In this embodiment separate straight separator strips may be arranged between adjoining inserts.

A further embodiment is characterised by a grid, consisting of straight separator strips and perpendicularly arranged straight transverse strips, said strips together defining in combination with the bottom and cover of the duct the longitudinal channels and the transition channels.

Preferably the inserts and/or separator strips are provided by removable wall parts e.g. break-away sections, in order to obtain apertures for passing cables or conductors depending upon the choice of the elements to be connected to the cables.

When the cable duct has to accomodate for instance three separate cables or sets of conductors (cables 1, 2 and 3) it is necessary to pass the central cable 2 between two succeeding connection chambers from one transition channel to the other transition channel if the elements of said connection chambers should be connected respectively to cables 1 and 3 or 3 and 1. For such transitions of the central cable 2 it is necessary to provide sufficient space in the longitudinal direction of the duct and this means that a certain minimum distance should be required between succeeding connection chambers. However, when permitting the limitation, that the central cable 2 between succeeding connection chambers can only pass from a transition channel to the central channel or to a central connection chamber, it is possible to use a considerably smaller distance between succeeding connection chambers. In this case it is necessary to exclude the possibility to make connections between cable 1 in one connection chamber and cable 3 in the succeeding connection chamber. Such an arrangement is characterised in that the number of connection chambers, provided with an outlet or similar element, connected to the cables of the central longitudinal channel, is substantially equal to the total number of connection chambers, for elements connected to the other cables. In many cases there are no objections against this limitation, e.g. when the central cable or conductors belong to a power or main service group, said group being connected to a relatively considerable number of outlets or similar elements, the side channels containing e.g. a telephone cable and a high frequency cable for wireless and/or television purposes with a limited number of outlets.

Embodiments of the invention will be described with reference to the accompanying drawings.

FIG. 2 is a transverse section taken substantially along the plane of section line II—II of FIG. 1;

FIG. 4 is an elevational view showing one of the comb members utilized in the embodiment of FIG. 3;

FIG. 5 is a transverse section taken substantially along the plane of section line V—V of FIG. 3;

FIG. 7 is a transverse section taken substantially along the plane of section line VII—VII in FIG. 6;

FIG. 8 is a transverse section taken substantially along a plane of section line VIII—VIII in FIG. 6;

FIG. 9 is a longitudinal section taken through a still further embodiment of the invention; and FIG. 10 is a perspective view, portions being broken away, illustrating that section of the embodiment of FIG. 9 indicated generally in the area X of FIG. 9.

Figure 1:
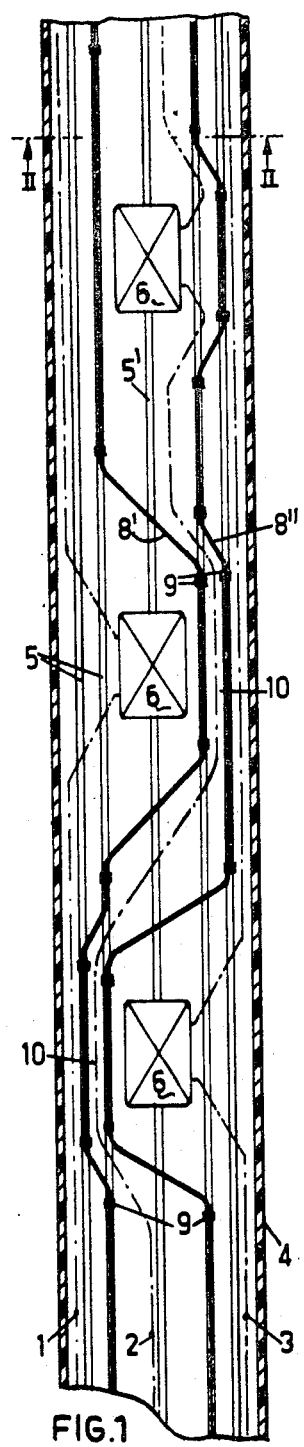
FIG. 1 is a longitudinal section illustrating details of one embodiment of the invention.

FIGS. 1 and 2 show a cable duct 4 with a U-shaped transverse section, said duct being manufactured of a suitable plastic, the bottom of the duct is provided with dovetailed fastening grooves 5. The cable duct contains three sets of electrical conductors or cables 1, 2 and 3. The central groove 5' may be used for fastening outlets, switches, lamp-fittings, armatures or similar elements 6 in a central position with respect to the duct, said elements passing through the cover plate 7 of the duct 4.

The required separation between the cables 1, 2 and 3 is obtained by means of resilient or flexible separator strips or barriers 8', 8'' said strips being bent and arranged by means of fasteners 9, inserted into the grooves 5 in such a way that the central cable 2 may be passed through a transition channel 10 in case the cable 1 or the cable 3 is connected to terminals of the element 6 of a central connection chamber. The shape of the flexible separator strips 8', 8'' depends upon the required connections to the element 6.

Figure 3:
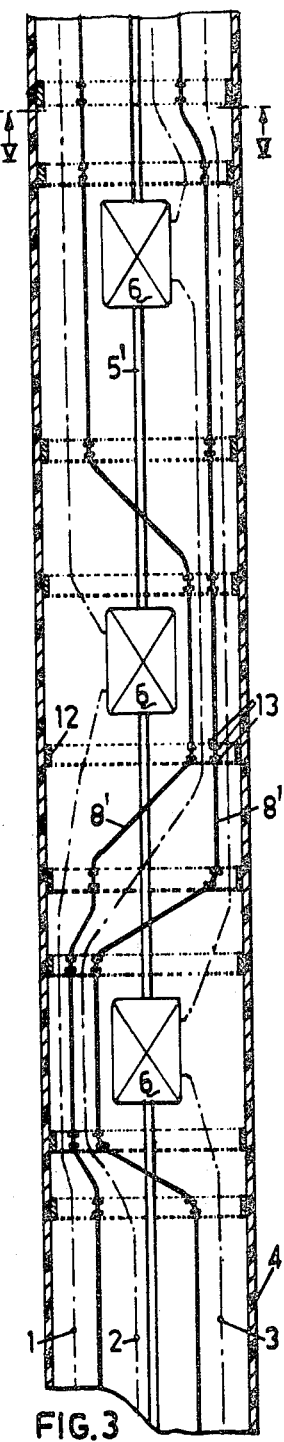
FIG. 3 is a longitudinal section taken through another embodiment of the invention.

The embodiment according to FIGS. 3, 4 and 5 substantially corresponds to the embodiment of FIGS. 1 and 2, but the attachment of the separator strips 8' and 8'' is obtained in this case by means of separating combs 12, see FIG. 4, provided with teeth 13, said teeth being removable by breaking away in such a way that only two teeth 13 on both sides of each separator strip 8' and 8'' remain. As may appear from FIG. 3 it is possible to provide every comb 12 with two rows of teeth 13 in order to obtain suitable guiding for the separator strips 8' and 8''.

Figure 6:
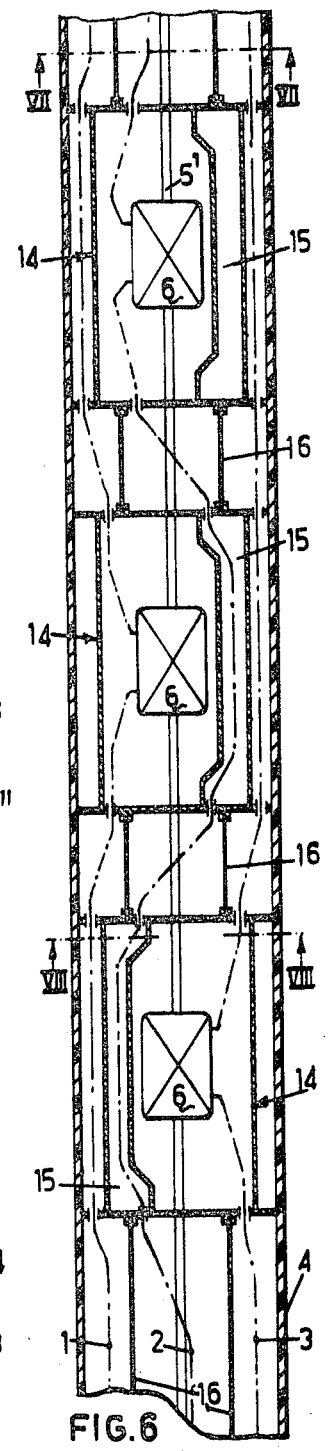
FIG. 6 is a longitudinal section taken through a further embodiment of the invention.

In the embodiment of FIGS. 6, 7 and 8 the formation of the connection chambers is obtained by means of separate insert pieces 14, said insert pieces containing not only the chamber for an element 6, but also a transition space 15. These inserts 14 are reversible in such a way that according to FIG. 6 the transition space 15 may be arranged to the left or to the right of the element 6 dpending upon the fact, whether said element should be connected to the cable 3 or the cable 1. Separate straight separator strips 16 are arranged between succeeding inserts 14. FIG. 6 shows, that the inserts are provided with removable wall parts, e.g. break-away sections, in order to obtain apertures 17 (FIG. 8) for passing cables 1, 2, 3. The bottom of the duct of this embodiment needs only the central groove 5' for fastening elements 6.

FIGS. 9 and 10 show a cable duct with a grid, consisting of straight separator strips 18 and perpendicularly arranged straight transverse strips 19, together defining the cable channels and the transition channels. The grid may be provided with the required apertures 17 by using break-away sections. The interconnection between the strips 18 and 19 may be obtained by providing vertical slots in the strips over half the height of the strips, see FIG. 10. The break-away sections may be arranged not only adjoining, according to FIG. 10, the bottom of the duct 4, but also adjoining the coverplate. In this way the instalment of the cables 1, 2, 3 is facilitated.

It is remarked, that the invention is not limited to cable ducts for three cables. The principle according to the invention may also be applied in cases for ducts with e.g. five cables. In wiring systems with larger numbers of cables preferably two or more cable ducts for three cables, as shown in the above embodiments, should be used.

FIG. 9 shows the connection of cable 3 to element 6' and of cable 1 to element 6''. Between the elements 6' and 6'', respectively the corresponding connection chambers, the cable 2 should pass from the left transition channel 20 to the right transition channel 21. This transition of cable 2 necessitates a certain minimum distance X between the chambers of the elements 6' and 6'' in view of the limited flexibility of the cable. If, however, between connections to the cables 1 and 3 always a connection to the cable 2 is present, see element 6''' in FIG. 9, the cable 2 has only to pass from a transition channel e.g. the channel 21, to a central connection chamber, in consequence of which the need for maintaining said distance X does not exist.

What I claim is:

1. A duct assembly for housing a number of electrical conductors in separated relation, which comprises:
    an elongate, generally U-shaped duct presenting a bottom wall and opposite side walls;
    an elongate cover bridging between said side walls and cooperating with said duct to provide an elongate enclosure space;
    a plurality of electrical elements disposed along the length of said cover substantially centrally between said side walls and communicating through said cover with said enclosure space to define longitudinally spaced electrical connection points; and
    separator means within said enclosure space for dividing said enclosure space into a number of longitudinally continuous and separate conductor channels, different ones of which channels communicate with different ones of said electrical connection points, there being at least three such channels, a first of said channels communicating with a first electrical connection point, a second of said channels communicating with a second electrical connection point while leading past said first electrical connection point, and a third of said channels leading past both said first and said second electrical connection points.

2. A duct assembly as defined in claim 1 wherein said separator means comprise resilient uninterrupted separator strips extending widthwise thereof between said bottom wall and said cover.

3. A duct assembly as defined in claim 2 wherein said bottom wall is provided with a plurality of longitudinally extending and laterally spaced grooves, and fastener means received in said grooves for securing each separator strip along one side edge thereof.

4. A duct assembly as defined in claim 2 including a plurality of comb members disposed transversely in said duct at longitudinally spaced points for locating said strips.

5. A duct assembly as defined in claim 1 wherein said separator means includes an insert located at each of said electrical connector points, each insert comprising a pair of transverse wall members and a plurality of longitudinally extending wall members, said transverse wall members having openings adjacent the opposite ends of each longitudinally extending wall member, and said separator means also including separator strips extending between opposing transverse wall members of adjacent inserts and separating said openings in the transverse wall members.

6. A duct assembly as defined in claim 5 wherein each insert includes a pair of outer longitudinally extending wall members in which the respective outer wall members of the individual inserts are longitudinally aligned in the duct assembly, and each insert including a further longitudinally extending wall member between said outer wall members, each further wall member being located closer to one outer wall member than to the other wall member whereby said inserts are reversible to communicate different ones of said conductor channels with said electrical connection points.

7. A duct assembly as defined in claim 5 wherein said transverse wall members are provided with removable sections for forming said openings therein.

8. A duct assembly as defined in claim 1 wherein said separator means comprise a pair of transverse separator strips disposed on opposite sides of each electrical connection point and longitudinally extending separator strips extending between said transverse separator strips.

9. A duct assembly as defined in claim 8 wherein said separator strips are provided with removable sections.

* * * * *